United States Patent

Feinleib

[15] 3,636,526

[45] Jan. 18, 1972

[54] INFORMATION-RECORDING SYSTEM EMPLOYING AMORPHOUS MATERIALS

[72] Inventor: Julius Feinleib, Birmingham, Mich.

[73] Assignee: Energy Conversion Devices, Inc., Troy, Mich.

[22] Filed: June 8, 1970

[21] Appl. No.: 44,225

[52] U.S. Cl.................340/173 LM, 350/160 R, 340/173 LS, 340/173 TP

[51] Int. Cl...........................................................G11c 13/04

[58] Field of Search................350/160 R, 160 P; 340/173 L, 340/173 LM, 173 LT, 173 CR, 173 TP

[56] References Cited

UNITED STATES PATENTS 3,530,441 9/1970 Oushinsky............................340/173

3,550,096 12/1970 Alphonse et al......................340/173

*Primary Examiner*—Terrell W. Fears

*Attorney*—Edward G. Fiorito

[57] ABSTRACT

The systems disclosed herein record information on an amorphous thin film by applying light to selected regions of the film. The temperature in these regions increases to the point where the film softens. Upon removal of the light the film returns to the solid phase leaving enclosed voids in the film. The information can be read from the amorphous film by irradiating the film with light of a wavelength in the order of magnitude of the size of the voids. The light is scattered or absorbed by multiple reflections produced by the voids allowing the selected regions to be readily detected. In order to erase the information the amorphous film is heated to the softening point, but not to a temperature as high as the temperature reached during recording. The softened amorphous film flows into the voids erasing the stored information.

26 Claims, 7 Drawing Figures

INVENTOR.
JULIUS FEINLEIB
BY Edward G. Fiorito
ATTORNEY

INVENTOR.
JULIUS FEINLEIB
BY Edward G. Fiorito
ATTORNEY

INFORMATION-RECORDING SYSTEM EMPLOYING AMORPHOUS MATERIALS

The present invention may be employed in digital systems wherein data is stored in the form of spots on a surface. The spots may be read out optically in a random, serial or parallel fashion to retrieve the information stored therein for processing, transmission or other purposes. This invention may also be used to store analog information, or human readable images.

Information has been recorded on thermoplastic materials by depositing a charge pattern on the surface of the thermoplastic material, heating the material so that the force of attraction of the charge deforms the material, and setting the deformation into the material by allowing it to cool. Information is read from such thermoplastic material by observing the effects of the deformations upon light reflected or transmitted through the surface.

Information has also been recorded by chemical processes such as photographic films. These films undergo a chemical change in response to exposure to light and are developed by placing the exposed films in a wet bath of chemical solutions to develop the information. Another chemical process for recording information involves the use of thermoplastic films impregnated with certain chemical salts. Upon exposing the thermoplastic film to radiation of a certain frequency the salts decompose and produce gas within the thermoplastic film. The subsequent application of heat softens the thermoplastic material so that the gas formed by the previous decomposition of the salt can expand to form gas bubbles within the thermoplastic material.

These chemical processes for recording are irreversible and the films cannot be reused or the information therein cannot be altered. Another disadvantage of the above processes is the requirement of a development step, such as a wet bath or heating step which introduces a delay in the speed of operation of the system.

The present invention utilizes a film of amorphous, glassy or plastic material which can be softened or made to flow in response to heat, but which does not decompose or alter its chemical composition in response to the application of heat. Voids are formed in the material through the application of electromagnetic energy, such as a laser beam, to selected regions of the film. The voids can be eliminated by applying energy in an amount sufficient to soften the film and cause the material to flow into the voids annealing them away. Accordingly, the present invention employs a reversible process permitting the amorphous film to be reused or the stored information to be altered. Also, no process steps are required to record information in addition to the single application of electromagnetic energy during the writing mode of operation. Further, reading can be accomplished simultaneously with the writing operation so that errors can be detected and corrected immediately.

Other advantages and features of this invention will be apparent to those skilled in the art upon reference to the accompanying specification, claims, and drawings in which:

Figure 1:
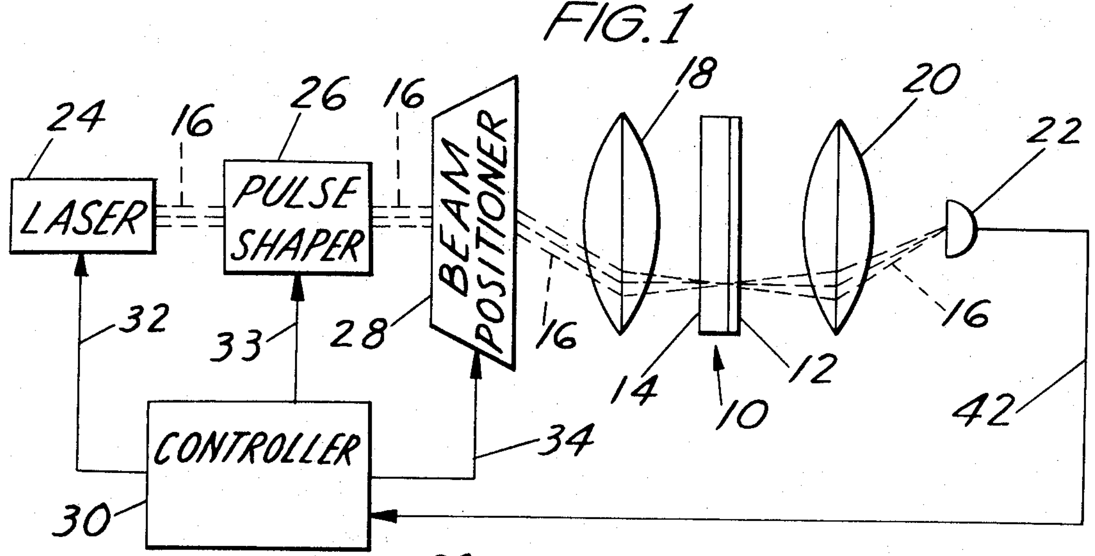
FIG. 1 is a schematic diagram illustrating a system embodying the present invention in which a laser is used to write, erase and read information on an amorphous film.

The system of FIG. 1 employs a recording unit 10 having an amorphous film 12 deposited on a glass substrate 14. A laser beam 16 is focused onto the interface between film 12 and substrate 14 by a lens 18. The laser beam 16 passes through recording unit 10 and is focused by a lens 20 onto a detector 22.

The laser beam 16 is generated by a laser source 24. A pulse shaper 26 forms beam 16 into the pulses illustrated in FIG. 2. The beam 16 is passed through a beam positioner 28 which directs beam 16 onto selected regions of the recording unit 10. Recording unit 10 may be in the form of a rectangle, circle or any other two-dimensional shape, and accordingly beam positioner 28 is capable of directing the beam 16 in two dimensions.

Figure 2:
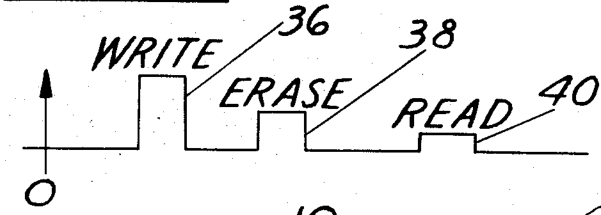
FIG. 2 is a waveform diagram illustrating the intensity and width of the laser pulses used to write, erase and read information on the amorphous film employed in the system of FIG. 1.

A controller 30 provides signals on a group of lines 32–34 to laser source 24, pulse shaper 26 and beam positioner 28, respectively. The signals on line 32 may alter the frequency or power of laser source 24, while the signals on lines 33 and 34 control the shape of the laser pulses and the region on recording unit 10 where beam 16 is applied. Referring to FIG. 2, a large pulse 36 is used to write information into the recording unit 10, while a smaller pulse 38 is used to erase information from recording unit 10. The frequency of the light energy in pulses 36 and 38 is selected so that substrate 14 is transparent to this frequency, while film 12 absorbs light of this frequency. Accordingly, very little light is transmitted through recording unit 10 during the write and erase operations. A read pulse 40 is applied to memory unit 10 at a selected region thereof, when it is desired to read information from that region. The frequency of laser source 14 is adjusted so that laser beam 16 passes through both substrate 14 and film 12 with little or no absorption. Accordingly, a lower intensity read pulse may be used. However, a high-intensity pulse would also operate satisfactorily. After read pulse 40 passes through memory unit 10 and is directed into sensor 22 by lens 20, a signal is developed on a line 42 which is fed back to controller 30. The form of the signal on line 42 is dependent upon the condition of the amorphous film 12 at the region where beam 16 is directed. The condition of film 12 at this region is in turn dependent upon whether or not a write pulse 36 or an erase pulse 38 has been applied thereto. If a write pulse 36 has been applied, the intensity of the read pulse 40 reaching sensor 22 is significantly less than if an erase pulse 38 has been applied, or no write pulse 36 has been applied to this region of film 12.

Figure 3:
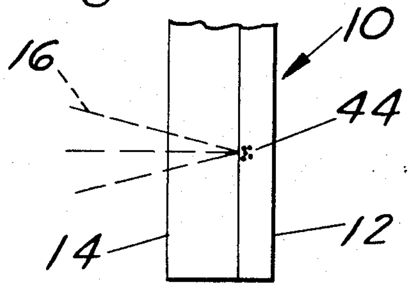
FIGS. 3–5 are expanded views of recording units including an amorphous film usable in the system of FIG. 1.

In FIG. 3 and expanded view of a portion of memory unit 10 is illustrated. The laser beam 16 is shown applied to a typical region of the film 12. Like numbers are applied to similar elements in FIGS. 1–7. After a write pulse 36 is applied to film 12 a group of voids 44 are created in a manner to be described in detail below. Upon application of a read pulse 40 to the region of film 12 containing voids 44 the laser beam 16 is scattered or absorbed by the voids 44 so that a small amount of energy is collected by sensor 22.

In accordance with one application of the system of FIG. 1, binary bits of information can be stored in recording unit 10 by dividing film 12 into a matrix of recording regions, each region accommodating one bit of information which may be as small as 1 micron permitting up to $10^8$ bits of information to be recorded on a 1-inch square recording unit 10. Each time a "1" binary bit of information is to be recorded a write pulse 36 may be applied to a corresponding region of film 12 in response to signals on lines 32–34 from controller 30, which may in turn receive control signals from a magnetic tape, disc, data transmission line or other data processing system or peripheral equipment. A "0" may be recorded on film 12 either by the absence of a write pulse 36, or if voids 44 already exist at the selected region of film 12, an erase pulse 38 is applied thereto causing the voids 44 to disappear in a manner to be described in detail below. Readout of the matrix of binary information stored on memory film 12 can be accomplished, for example, by applying a series of read pulses 40 to a selected row or column. The signals fed back on line 42 are interpreted in controller 30 by synchronizing such signals with the positioning signals on line 34. The data retrieved from storage unit 10 may be supplied by controller 32 to a data processing system, data transmission system or any other peripheral equipment.

One amorphous film 12 is found to be suitable for operation in accordance with the present invention is composed of an alloy of selenium with about 2.5 percent sulphur by atomic weight. This alloy may be sputtered onto a Corning 7059 glass substrate 14. One satisfactory thickness for substrate 14 is 1 millimeter, while the sputtered film 12 may be 5 microns thick. The write pulse 36 for this recording unit 10 may be 4 microseconds wide and 200 milliwatts intensity for depositing 800 nanojoules on a selected region of film 12. By using a 10X objective lens 18 the laser beam 16 is focused to a spot of about 15 microns in diameter. The distribution of energy in pulse 36 on this spot is very nonuniform but is probably Gaussian, with a sharp maximum in the center. The group of voids 44 are usually formed in the center of the spot and collect in an area of the order of 1 to 3 microns in diameter. The appropriate size for each of the voids 44 is in the order of magnitude of the wavelength of the energy is read pulse 40. For example if laser beam 16 has a wavelength of 6,000 angstroms, voids having a cross section in the direction of the beam 16 of 1,000 angstroms would be adequate for scattering or absorbing a significant portion of the energy in pulse 40. Scattering would divert beam 16 from the path which would arrive at sensor 22. Absorption results from reflection of the laser light within each of the voids 44 and also between surfaces of adjacent voids 44 producing multiple lossy reflections. A high index of refraction for amorphous film 12 is preferable in order to obtain good scattering and absorption. A refractive index of about 3.2 is sufficient for satisfactory operation.

When the system of FIG. 1 employs an amorphous film 12 composed of the alloy mentioned above (selenium with 2.5 percent sulphur) an erase pulse 38 may have a 4-microsecond width and an intensity of 70 milliwatts producing 280 nanojoules of energy in the amorphous film 12. Upon application of such a read pulse 40 the voids 44 anneal out returning amorphous film 12 to its original condition prior to application of a write pulse 36. An amorphous film 12 composed of this same alloy can be sputtered on a substrate 14 composed of sapphire. For this recording unit 10, larger energy pulses 36 and 38 are preferable. For example, a write pulse 36 of 4 microseconds width should have an intensity of approximately 225 milliwatts for depositing 900 nanojoules on the amorphous film 12, and the erase pulse 38 having a pulse width of 4 microseconds may have an intensity of approximately 80 milliwatts energy for depositing 320 nanojoules. The read pulse 40 may have an energy which is capable of having variations therein detected by sensor 22.

Figure 4:
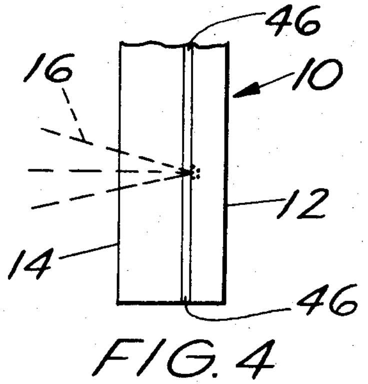

Another storage unit 10 is illustrated in FIG. 4 with an undercoating 46 sandwiched between substrate 14 and amorphous film 12. The undercoating 46 may be a sputtered layer of $Al_2O_3$, or a thin layer of polystyrene which is applied to substrate 14 by dipping substrate 14 into a solution of polystrene. Undercoating 46 is transparent to laser beam 16. An amorphous film 12 composed of the above-mentioned alloy may be sputtered on the undercoating to a thickness of 5 microns, and the substrate 14 may be approximately 1 millimeter thick. Where the undercoating 46 is composed of polystyrene of a thickness of about 1,000 A. and the substrate 14 is composed of Corning 7059 glass, a write pulse 36 of 1-microsecond width and an intensity of 105 milliwatts depositing 105 nanojoules on amorphous film 12 is suitable for operation in the system of FIG. 1. The erase pulse 38 of 1-microsecond width may have an intensity of 17.5 milliwatts and deposit 17.5 nanojoules. The same recording unit 10 with a sapphire substrate 14 instead of a glass substrate can operate in response to a write pulse 36 of 1-microsecond width, 90 milliwatts intensity depositing 90 nanojoules, and an erase pulse 38 of 1-microsecond width, intensity of 35 milliwatts depositing 35 nanojoules. Another suitable recording unit 10 can be composed of a Corning 7059 glass substrate 14, a sputtered layer of $Al_2O_3$ and an amorphous film 12 composed of the above-mentioned alloy. For this recording unit 10 a suitable write pulse 36 may be 4 microseconds wide, contain an energy of 200 milliwatts and deposit 800 nanojoules. The erase pulse 38 may be 4 microseconds wide, 70 milliwatts of energy and deposit 280 nanojoules.

Another amorphous film 12 found suitable for operation in accordance with the present invention is composed of an alloy of $Se_{88\%}$ $Te_{12\%}$ atomic weight which may be deposited in a 5-micron thick film on a Corning 7059 glass substrate 14. For this alloy a 1 microsecond wide write pulse 36 may be used having a 150-milliwatt intensity and producing 150 nanojoules of energy in the amorphous film 12. A satisfactory erase pulse 38 may be 1 microsecond wide with an intensity of 50 milliwatts depositing 50 nanojoules of energy on the amorphous film 12.

Other amorphous films 12 found suitable for use include alloys of selenium and sulphur with from 1 to 10 percent sulphur, and alloys of selenium with from 5 to 15 percent tellurium.

Many other amorphous materials and alloys are suitable for use in the present invention. For example, chalcogenide glasses, plastics, resins and amorphous semiconductor materials exhibit the characteristics suitable for use herein. Many of the amorphous semiconductor materials described in U.S. Pat. No. 3,271,591 entitled "SYMMETRICAL CURRENT CONTROLLING DEVICE" by Stanford R. Ovshinsky exhibit the thermodynamic characteristics conductive to forming voids 44 in response to the application of electromagnetic energy. One preferred characteristic of the amorphous film 12 is its ability to soften in response to heat, but not to decompose even if it becomes liquefied or vaporized. For example, alloys composed chiefly of selenium have a glass transition temperature of about 50° C. at which temperature the alloy begins to become soft and can flow. Somewhere in the neighborhood of 700° C. selenium begins to boil providing a substantial vapor pressure. Vapor bubbles can nucleate and expand in the soft or liquefied alloy at these elevated temperatures. So long as the amorphous film 12 is characteristic enough the vapor bubbles cannot escape from the interface between substrate 14 and amorphous film 12 for the recording unit illustrated in FIG. 3, or escape from the interface between amorphous film 12 and undercoating 46 in the recording unit 10 illustrated in FIG. 4. Where the heating is caused by a write pulse 36 which has a steep trailing edge, the heat in the vicinity of the vapor bubbles decays rapidly causing the amorphous film 12 to return to the glassy state from the softened or liquid state during which the vapor bubbles are created. A desirable characteristic of the amorphous film 12 is a very narrow glass transition temperature band. Materials having such property freeze in the vapor bubbles very rapidly when the material cools down to the critical temperature thereby trapping the voids 44. Depending upon the mechanical properties of the amorphous film 12 at or in the vicinity of room temperature, the vapor bubbles will either collapse into a group of discs or remain substantially in a spherical configuration. Amorphous films 12 composed chiefly of selenium alloys are very ductile near room temperature and accordingly the vapor bubbles are compressed into a disc-shaped configuration due to the loss of vapor pressure upon condensation of the vapor on the inside walls of the bubbles. Other alloys such as those including germanium, arsenic, sulphur, tellurium and selenium which have a higher glass transition temperature around 150° to 200° C. produce a brittle bubble shell rapidly after the write pulse 36 terminates freezing the vapor bubble in substantially a spherical configuration.

The voids 44 thus formed can be erased by heating the amorphous film to its softening point, for example in selenium alloys to the glass transition temperature of about 50° C., resulting in a collapse of the ductile material around the voids. At this temperature the amorphous material flows into the voids 44 and anneals the voids 44 away thereby erasing the information.

The voids 44 may also be formed in some amorphous films due to a change in the density of the amorphous film 12 in response to the heat from laser beam 16. Upon application of the write pulse 36 amorphous film 12 expands in the region where the energy is deposited causing the outer surface of film 12 to bulge due to the soft ductile characteristic of the film 12 above its glass transition temperature. Upon cooling, the outer surface of the film 12 cools rapidly causing it to return to the solid-phase freezing in the bulge. As the inner portion of the film 12 near the interface with either the substrate 14 in FIG. 3 or undercoating 46 in FIG. 4 begins to cool, it contracts causing the voids 44 to appear. As described above the erase pulse 38 raises the temperature sufficient to cause the amorphous film to become ductile annealing the voids 44 out. Still another factor contributing to the separation of the amorphous film 12 from either the substrate 14 in FIG. 3 or undercoating 46 in FIG. 4, is the variation in surface adhesion. At or near room temperature amorphous film 12 adheres well to substrate 14 or undercoating 46. However as the temperature is raised past the glass transition point the adherence decreases so that a separation occurs.

Figure 5:
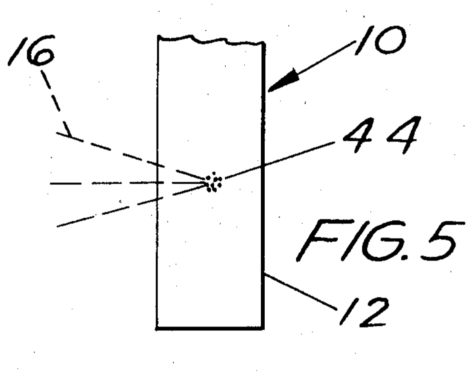

Another form of recording unit 10 is illustrated in FIG. 5 where a single layer of amorphous film 12 is utilized without any accompanying substrate 14. This amorphous film 12 should be composed of an alloy having, in addition to the characteristics described above, mechanical rigidity. The frequency of the write and erase pulses 36 and 38 should be selected so that the amorphous film 12 is partially transparent allowing the focused laser beam 16 to penetrate beneath the outer surface of the film 12. Accordingly the maximum amount of heat generated by laser beam 16 occurs at the region where voids 44 are formed. Any vapor pressure formed in this region is trapped within the film 12.

Figure 6:
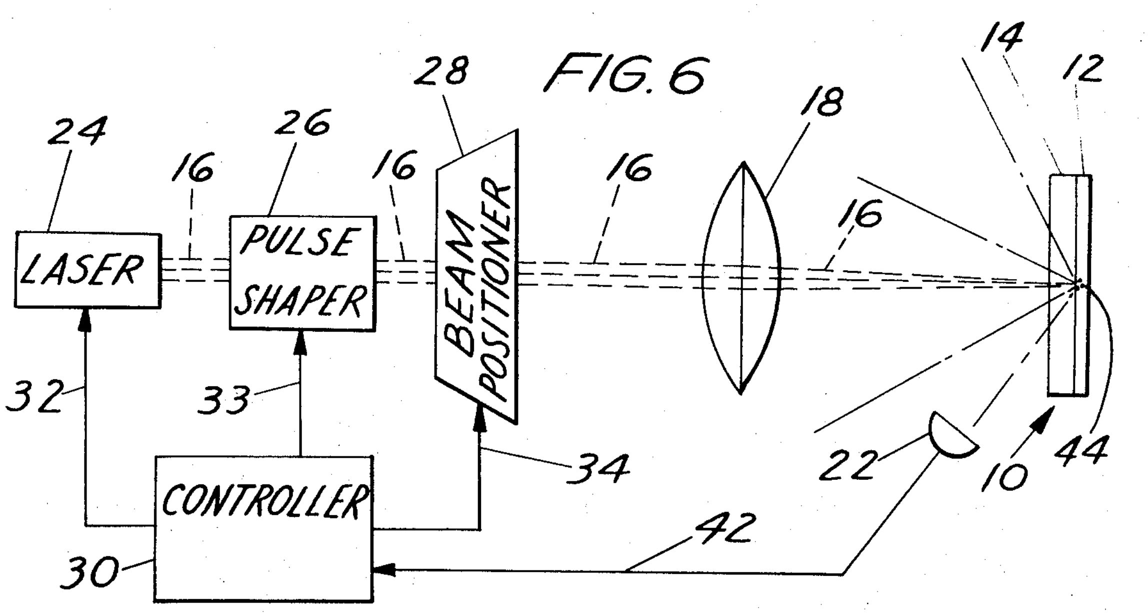
FIG. 6 is a schematic diagram illustrating another system embodying the present invention in which a laser beam is reflected from an amorphous film during the read operation.

FIG. 6 illustrates another embodiment of the present invention in which sensor 22 is used to gather laser light reflected from memory unit 10. Voids 44 scatter light in many directions when struck by laser beam 16 during the read operation causing some light to be collected by detector 22. When laser beam 16 is directed onto a region of amorphous film 12 which does not have voids, the reflection is essentially specular in nature and accordingly does not strike sensor 22. The write and erase operations of the system of FIG. 6 are similar to that described with reference to the system of FIG. 1. The read pulse 40 however in the system of FIG. 6 need not be a different frequency from the write pulse 36 and erase pulse 38 since it is not necessary for the read pulse 40 to be transmitted through the amorphous film 12 as in the system of FIG. 1. Further details regarding the operation of the system of FIG. 6 may be found in copending U.S. application Ser. No. 17,641 filed Mar. 9, 1970, entitled "INFORMATION STORAGE SYSTEMS UTILIZING AMORPHOUS THIN FILMS" by Julius Feinleib. Further details concerning the system illustrated in FIG. 1 may be found in copending U.S. applications Ser. No. 12,622 filed Feb. 19, 1970, entitled "OPTICAL MASS MEMORY EMPLOYING AMORPHOUS THIN FILMS" by Julius Feinleib, and Ser. No. 16,697 filed Mar. 5, 1970, entitled "INFORMATION STORAGE SYSTEMS" by Julius Feinleib.

Figure 7:
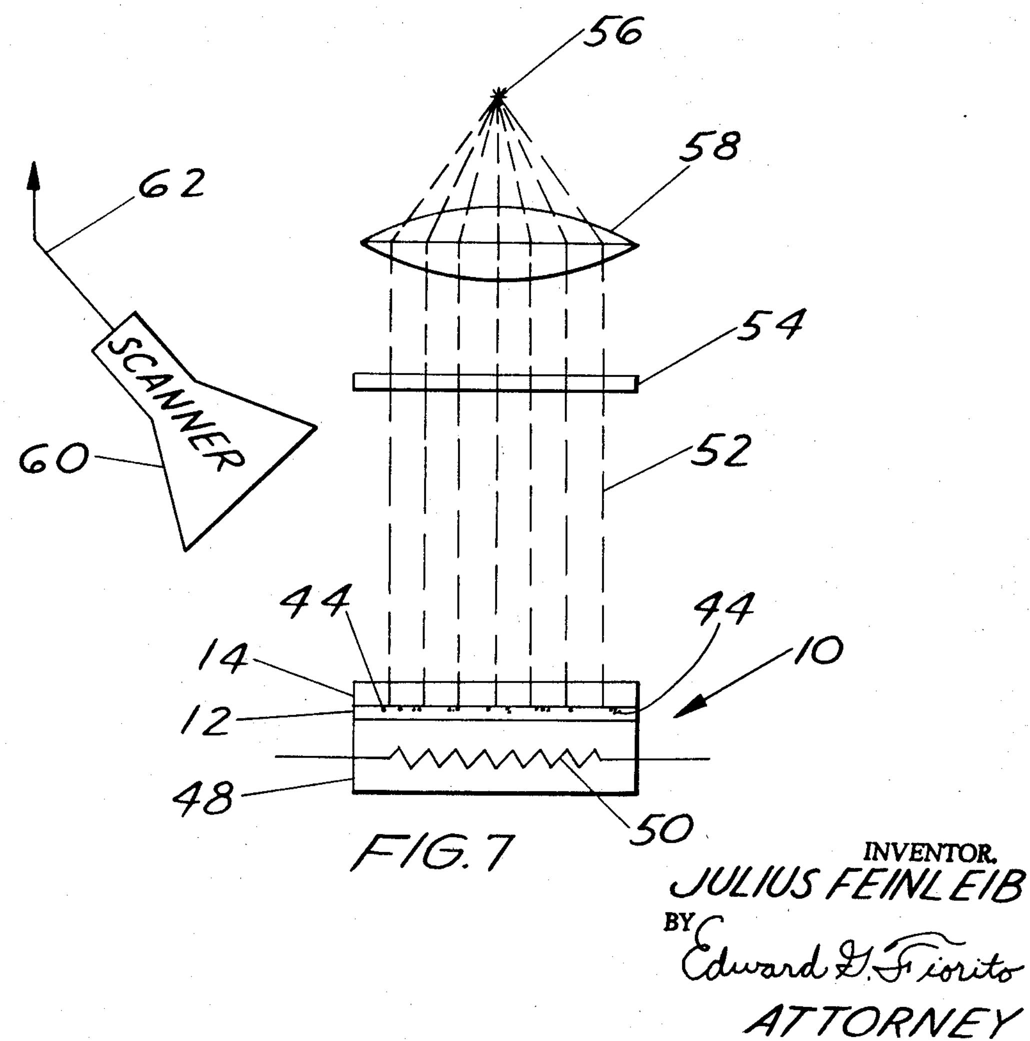
FIG. 7 is a schematic diagram illustrating a system embodying the present invention wherein information is recorded in parallel on an amorphous film utilizing a broad light source.

FIG. 7 illustrates another form of the present invention which employs a memory unit 10 having a heating element 48 in contact with the amorphous film 12. The heating element 48 has a resistor 50 imbedded therein which produces heat when current passes therethrough. This heat is used to erase the entire amorphous film 12 eliminating voids 44 in the same way that erase pulse 38 eliminates voids 44 in the systems of FIGS 1 and 6. Writing is accomplished in parallel by passing a beam 52 of light through a transparent negative 54 containing a pattern or image to be recorded. The light passing through negative 54 produces voids 44 in the same manner described with reference to FIGS. 1 through 6. Light 52 may be produced from a point source 56 such as an arc lamp which is converted into parallel rays by a lens 58. The same light 52 from point source 56 may be used to read the information stored in memory unit 10 by decreasing the intensity thereof below the threshold at which voids 44 begin to form. Light scattered from voids 44 arrives at a scanner 60 which scans the entire surface of recording unit 10 converting the light reflected therefrom into a corresponding series of electrical signals on a line 62 which may be supplied to a data processing system, communications system or other peripheral equipment. The information recorded on unit 10 in FIG. 7 may be humanly readable information including varying shades of gray depending upon the intensity of the light 52 striking any region of the amorphous film 12. Alloys composed primarily of selenium may be used advantageously to form the amorphous film 12 in systems recording humanly readable information since such alloys are transparent to light within the visible spectrum. Analog information may be recorded on the recording unit 10 of any of the systems in FIGS. 1, 6 or 7. While a laser source 24 was illustrated in the systems of FIGS. 1 and 6, an electron beam, heat source or any other means of depositing energy on amorphous film 12 may be employed. It is preferable during the writing operation to apply the heat to a local area on film 12 which is thermally isolated from adjacent regions where other information is desired to be recorded. This isolation may be achieved through the selection of materials which have a low thermal conductivity.

It may be preferable in some applications to select amorphous films 12 composed of alloys which have one component which is more volatile than the other components, so that this component is driven off when the amorphous film 12 is heated above the glass transition temperature. In order for the recording unit 10 to operate in a reversible mode the more volatile component must be capable of being reabsorbed into the alloy during the erase operation.

During readout of the recording unit 10, the voids 44 contribute a significant effect upon the light passing through or reflected from the amorphous film 12. However, there could also be accompanying characteristics of the amorphous film which also contribute to and enhance the changes in the light used for reading information out of unit 10. For example, microcrystallization may accompany the formation of voids 44, or other changes in phase may occur. Additionally, any vapors contained in bubbles formed by vapor pressure will condense into coatings on the inside of the voids 44. These coatings may have a different density, and accordingly a different index of refraction contributing to the changes in light passing through or reflected from amorphous film 12.

It is also possible in some applications to deposit the amorphous film 12 on flexible substrates 14 such as webs, discs or other movable media for transporting the amorphous film 12 through read, write or erase stations of various information recording systems. Additionally, the substrate 14 can be composed of other low-sodium-type glasses than those mentioned herein.

Another advantage of the systems of FIGS. 1 and 6 is the ability to simultaneously write and read data bits stored in recording unit 10. For example, in the system of FIG. 1 a write pulse 36 of a frequency absorbed by amorphous film 12 may be applied to a selected region of film 12, and at the same time a read pulse 40 of a frequency which is transmitted through recording unit 10 can be applied to the same selected region. Accordingly, the instant voids 44 appear in the selected region of recording unit 10, a signal is developed by sensor 22 indicating that a data bit is now recorded in the selected region. Controller 30 receives such signal on line 42 and compares this signal with the control signals on lines 33 and 34 thereby performing an error check on a real time basis. No delay is encountered due to an intermediary development step between the write operation and read operation of the present invention. A similar error check can be accomplished in the system of FIG. 6.

Numerous other modifications may be made to various forms of the invention described herein without departing from the spirit and scope of the invention.

What is claimed is:

1. An information-recording system comprising:

a source of electromagnetic energy;

an amorphous film capable of being softened in response to heat produced by application of said electromagnetic energy;

writing means for applying to selected regions of said film, said electromagnetic energy in sufficient amount to heat said film above a certain threshold temperature causing said film to soften and create vapor pressure which causes voids therein after cooling;

reading means for detecting said selected regions of said film in which said voids reside; and erasing means for applying to said film energy in an amount sufficient to soften said film, but not to elevate the temperature thereof above said certain threshold temperature, whereby said softened film flows to fill said voids.

2. The system as defined in claim 1 wherein said amorphous film expands in response to heat produced by application of said electromagnetic energy and contracts after said electromagnetic energy is removed thereby leaving said voids in those selected regions wherein said certain threshold temperature is exceeded.

3. The system as defined in claim 1 further characterized by the addition of a layer of material in contact with a surface of said amorphous film upon which said electromagnetic energy is applied, and which material is transparent to said electromagnetic energy.

4. The system as defined in claim 3 wherein said amorphous film and layer of material exhibit a surface adhesion at the interface therebetween prior to heating above said certain threshold temperature, and exhibit a reduction in said adhesion at said interface after being heated above said certain threshold temperature, thereby producing said voids at said interface.

5. An information-recording system comprising:

a source of electromagnetic energy;

an amorphous film capable of being softened and vaporized in response to heat produced by application of said electromagnetic energy;

writing means for applying to selected regions of said film, said electromagnetic energy in sufficient amount to heat said film, softening and vaporizing portions thereof, and forming vapor pressure bubbles at said selected regions;

means for preventing the escape of said vapor bubbles from said film thereby causing said vapor to condense inside said bubbles leaving voids in said film;

reading means for detecting said selected regions of said film in which said voids reside; and erasing means for applying to said film energy in sufficient amount to soften but not vaporize said film, whereby said softened film collapses to fill said voids.

6. The system as defined in claim 5 wherein said means for preventing the escape of said vapor bubbles includes a layer of material in contact with a surface of said amorphous film upon which said electromagnetic energy is applied, and which material is transparent to said electromagnetic energy.

7. The system as defined in claim 6 further characterized by the addition of a plastic undercoating sandwiched between said film and material, and which plastic is transparent to said electromagnetic energy.

8. The system as defined in claim 5 wherein said means for preventing the escape of said vapor bubbles includes a focusing means for converging said electromagnetic energy at a point within said film which is sufficiently distant from any outer surfaces of said film to prevent said vapor bubbles from flowing through said film to an outer surface thereof.

9. The system as defined in claim 1 wherein said amorphous film is composed of an amorphous semiconductor material.

10. The system as defined in claim 9 wherein said amorphous semiconductor material includes selenium.

11. The system as defined in claim 1 wherein said amorphous film exhibits a high refractive index.

12. The system as defined in claim 1 wherein said amorphous film is a chalcogenide glass.

13. The system as defined in claim 1 wherein said electromagnetic energy is light.

14. The system as defined in claim 12 wherein the diameter of said vapor bubbles is in the order of magnitude of the wavelength of said light.

15. The system as defined in claim 1 wherein said source of variable electromagnetic energy is a laser.

16. The system as defined in claim 1 wherein said writing means includes means for directing said electromagnetic energy into discrete ares of said film, each area being separated sufficiently to provide thermal isolation so that the operation of said writing means and erasing does not overlap on said film.

17. The system as defined in claim 16 wherein said erasing means includes means for directing said electromagnetic energy into selected ones of said discrete areas.

18. The system as defined in claim 16 wherein said writing means includes means for shaping said electromagnetic energy into a plurality of pulses of energy, each pulse being directed into a different discrete area of said film.

19. The system as defined in claim 18 wherein said erasing means includes means for directing a pulse of said electromagnetic energy into selected ones of said discrete areas.

20. The system as defined in claim 19 wherein the pulses applied to said film by said writing means contain a greater amount of electromagnetic energy than the pulses applied to said film by said erasing means.

21. The system as defined in claim 1 wherein said reading means includes means for directing said electromagnetic energy on selected regions of said film, and sensing means for determining changes produced in said electromagnetic energy by the relative difference in the index of refraction between said film and voids.

22. The system as defined in claim 21 wherein said electromagnetic energy is light.

23. The system as defined in claim 22 wherein said light is scattered upon striking a void in said film.

24. The system as defined in claim 22 wherein said light is absorbed by multiple reflections within said voids.

25. The system as defined in claim 23 wherein changes in said light are sensed by observing light reflected from said film.

26. The system as defined in claim 24 wherein changes in said light are sensed by observing the amount of absorption of said light transmitted through said film.

* * * * *